United States Patent

[11] 3,625,974

[72] Inventors: Suminori Umio
Kawani-shi;
Ikuo Ueda, Sakai, both of Japan
[21] Appl. No. 722,169
[22] Filed Apr. 18, 1968
[45] Patented Dec. 7, 1971
[73] Assignee Fujisawa Pharmaceutical Co., Ltd.
Osaka, Japan
[32] Priorities Apr. 28, 1967
[33] Japan
[31] 42/27625;
Mar. 9, 1968, Japan, No. 43/15528; Mar. 9, 1968, Japan, No. 43/15529

[54] DIBENZOTHIAZEPINE DERIVATIVES
9 Claims, No Drawings
[52] U.S. Cl................................................... 260/327,
260/247.1, 260/268, 260/293.4, 260/307,
260/310, 260/313.1, 424/248, 424/267, 424/272,
424/273, 424/274, 424/275
[51] Int. Cl...................................................A61k 27/00,
C07d 93/42
[50] Field of Search............................................ 260/327 B

[56] References Cited
UNITED STATES PATENTS
3,188,322   6/1965   Yale et al...................... 260/327

FOREIGN PATENTS
1,385,360   12/1964   France .......................... 260/327
1,385,360   11/1966   France .......................... 260/327

Primary Examiner—Henry R. Jiles
Assistant Examiner—C. M. Shurko
Attorneys—John J. Hart, Charles E. Baxley, Frank M. Nolan and Thomas E. Tate ABSTRACT: Compounds of the formula

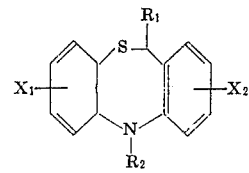

wherein each of $X_1$ and $X_2$ is hydrogen or halogen; $R_1$ is alkyl, haloalkyl, aralkyl or alkyl substituted with $R_3$ in which $R_3$ is amino, alkylamino, dialkylamino; and $R_2$ is hydrogen, alkyl, haloalkyl, aralkyl or alkyl substituted with $R_3$ in which $R_3$ is the same meaning as defined above, provided that either $R_1$ or $R_2$ should be alkyl substituted with $R_3$. These compounds possess potent antireserpinelike activity which makes them useful as an antidepressant.

DIBENZOTHIAZEPINE DERIVATIVES

This invention relates to new dibenzothiazepine derivatives and their salts, as well as the production of the same.

In accordance with the invention there is provided a new compound of the formula (I):

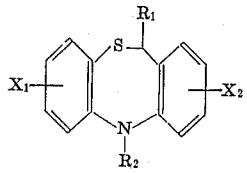

wherein each of $X_1$ and $X_2$ is hydrogen or halogen; $R_1$ is alkyl, haloalkyl, aralkyl or alkyl substituted with $R_3$ in which $R_3$ is amino, alkylamino, dialkylamino or saturated 5 to 7 membered N-heterocyclic radical: and $R_2$ is hydrogen, alkyl, haloalkyl, aralkyl or alkyl substituted with $R_3$ in which $R_3$ is the same meaning as defined above, provided that either $R_1$ or $R_2$ should be alkyl substituted with $R_3$, or salt thereof.

In the above and subsequent description and claims of this invention, the term "halogen" and the halogen atom in the term "haloalkyl" and "haloaryl" means fluorine, chlorine, bromine and iodine; the term "alkyl" means a straight, branched or cyclic monovalent hydrocarbon having one to six carbon atoms, such as methyl, ethyl, propyl, isopropyl, butyl, isobutyl, pentyl, hexyl, cyclohexyl and the like; the alkyl radical in the term "haloalkyl," "alkylamino," "dialkylamino," "alkyl substituted with $R_3$," "alkylimino" and "hydroxyalkylimino" means a straight or branched monovalent hydrocarbon having one to six carbon atoms, such as methyl, ethyl, propyl, isopropyl, butyl, isobutyl, pentyl, hexyl and the like; the term "aralkyl" and the aralkyl radical in the term "aralkylimino" mean a monocyclic aryl monovalent hydrocarbon such as benzyl, phenethyl, α-menthylbenzyl, phenylpropyl, tolylmethyl, xylylmethyl and the like; the term "aryl" and the aryl radical in the term "haloaryl" and "arylimino" mean a monocyclic aromatic monovalent hydrocarbon such as phenyl, tolyl, xylyl and the like; the term "a saturated 5 to 7 membered N-heterocyclic radical" means nitrogeneous monocyclic one which may be substituted with hydroxy and either aryl or haloaryl, and whose carbon chain may be interrupted or not with oxo, imino, alkylmino, hydroxyalkylimino, aralkylimino or arylimino, such as 1-pyrrolidinyl, 1-pyrazolidinyl, 1-oxazolidinyl, piperidino, 1-piperazinyl, 4-methyl(or ethyl)-1-piperazinyl, 4-hydroxyethyl (or hydroxymethyl)-1-piperazinyl, 4-benzyl-1-piperazinyl, 4-phenyl-1-piperazinyl, 4-hydroxy-4-phenylpiperidino, 4-hydroxy-4-(4-chlorophenyl)piperidino, morpholino, 1-azepinyl and the like.

Among salts of the dibenzothiazepine derivatives (I), there are included a nontoxic acid addition salts as well as a quarternary ammonium salts thereof. Examples of the nontoxic acid addition salts are the salts with an inorganic acid such as hydrochloric acid, hydrobromic acid, sulfuric acid and the like, and with an organic acid such as maleic acid, tartaric acid, citric acid, succinic acid, picric acid, p-toluenesulfonic acid and the like. Also, as to the quarternary ammonium salts, there are exemplified the salts with alkyl halide such as methyl chloride, methyl bromide, methyl iodide, ethyl chloride, ethyl bromide, ethyl iodide, propyl iodide and the like, and with aralkyl halide such as benzyl chloride, benzyl bromide, phenethyl bromide and the like.

The compound (I) of this invention is novel and of great worth medically. More particularly, it possesses, for instance, a potent reserpine-antagonism and is useful as an antidepressant.

The compound (I) of this invention may be administered orally and parenterally in the therapeutical use. The pharmaceutically useful compositions containing the compound (I) together with a significant amount of a nontoxic solid or liquid carrier are also included within a scope of this invention. In such compositions are included solid compositions such as tablets, pills, dispersible powders and granules, and liquid solutions such as injectable solutions, orally administrable solutions and suspensions.

In solid compositions one or more of the active compounds is or are admixed with an inert diluent such as potato starch, lactose, calcium phosphate and further additional substances, if needed, such as a lublicant, e.g. magnesium stearate and the like; a binder, e.g. gelatin and the like; and a disintegrator, e.g. cellulose calcium glycolate and the like. In solid compositions, are included capsules of absorbable material such as gelatin containing one or more active compounds with or without the addition of diluents or excipients, and also suppositories for rectal administration containing one or more active compounds for which bases are exemplified with cacao butter, glycerogelation, polyvinylalcohol, vegetable hardened oil, etc.

The compound (I) of this invention may be prepared basically by alkylation of an appropriate dibenzothiazepine compound in which there is replaceable hydrogen atom at the 5the or 11th position of dibenzothiazepine ring, or by ring-closing reaction of an appropriate amino benzylthiophenol derivative.

More concretely, the compound (I) may be prepared by treating a compound of the formula (II):

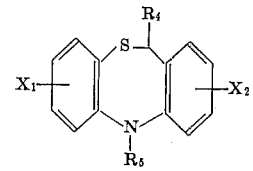

wherein $X_1$ and $X_2$ are the same meaning as defined in the formula (I), $R_4$ is hydrogen, alkyl, haloalkyl, aralkyl or alkyl substituted with $R_3$, and $R_5$ is hydrogen, alkyl, haloalkyl, aralkyl or alkyl substituted with $R_3$ in which $R_3$ is the same meaning as defined in the formula (I), provided that at least one of $R_4$ and $R_5$ should be hydrogen.
with an organic lithium compound and an alkylating agent, or with an alkylating agent in the presence of an alkaline condensing agent, and, if needed, treating the resultant compound (I) of $R_1$ or $R_2$ being haloalkyl with an amine of the formula: $R_3$—H wherein $R_3$ is the same meaning as described above. Alternatively, the compound (I) may also be obtained by ring-closing with heating a compound of the formula (III):

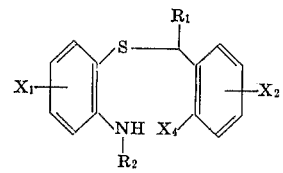

wherein $X_1$, $X_2$, $R_1$ and $R_2$ are the same meaning as defined above, and $X_4$ is an acid residue.

The compound (II) and (III) as the starting compound include known and unknown ones, and the compound (III) may be obtained, for instance, by the reaction of an 2-aminothiophenol derivative and a 2-halobenzyl halide derivative and also the compound (II) may be prepared by ring-closing reaction of an appropriate 2-aminobenzylthiophenol derivative.

The reaction for the production of the compound (I) of this invention will each herein after illustrated in detail.

ALKYLATION

1. C-Alkylation

This alkylation is substantially concerned with the replacement of the hydrogen atom at 11th position of the compound (II) with a group of $R_6$ wherein $R_6$ has the same definition with $R_1$ of the formula (I). The reaction is carried out by treating the compound (II) wherein $R_4$ is hydrogen, with an organic lithium compound and an alkylating agent to give the desired compound (I).

As an organic lithium compound to be used, there are included an alkyl lithium (e.g. methyl, ethyl, propyl, isopropyl, butyl or isobutyl lithium and the like), aryl lithium (e.g. phenyl, tolyl, xylyl or naphthyl lithium and the like) and aralkyl lithium (e.g. benzyl, phenethyl, phenylpropyl or tolymethyl lithium and the like).

The alkylating agent as used herein are a reactive ester of alkyl alcohol (or haloalkyl, aralkyl or $R_3$-alkyl alcohol) which is representable by the formula of $R_6$–$X_3$ wherein $R_6$ has the same meaning with $R_1$ of the formula (I) and $X_3$ is an acid residue. "$R_3$-alkyl" as used herein and hereinafter means alkyl substituted with $R_3$.

Examples of the alkylating agent are alkyl, haloalkyl, aralkyl and $R_3$-alkyl halide(chloride, bromide and iodide); alkyl, haloalkyl, aralkyl and $R_3$-alkyl p-toluenesulfonate; alkyl, haloalkyl, aralkyl and $R_3$-alkyl sulfonate and the like, among which the halide can be preferably used in this reaction.

When using of haloalkyl halide, it is desired to select one having two different halogens such as chloroalkyl bromide, chloroalkyl iodide or bromoalkyl iodide.

The reaction is generally carried out in a solvent such as ether, n-hexane, benzene or other inert solvent, and at room temperature or approximately at the boiling point of solvent to be used, though they are not particularly limited and depend on the kinds of the starting compound and other reagent to be applied.

Furthermore, as a reaction mechanism in this reaction, it is considered that the compound (II) as the starting compound is firstly reacted with an organic lithium compound, thereby to substitute a hydrogen atom in methylene part at the 11th position of the compound (II) with lithium, and then the lithium substitution product is reacted with an alkylating agent, thereby to substitute lithium with the alkyl part of the alkylating agent. Accordingly, it is preferable to treat firstly the compound (II) with an organic lithium compound and then the resultant mixture with an alkylating agent.

2. N-Alkylation

This alkylation is substantially concerned with the replacement of the hydrogen atom attached to nitrogen atom at the fifth position of the compound (II), with a group of $R_6$ wherein $R_6$ is the same meaning as defined above.

It is conducted by treating the compound (II) wherein $R_5$ is hydrogen, with an alkylating agent in the presence of an alkaline condensing agent to give the desired compound (I).

A few examples of the alkaline condensing agent to be used herein are alkali metal (e.g. sodium or potassium), alkaline earth metal (e.g. magnesium, calcium or barium), or their hydroxide, hydride, alkoxide or carbonate. As the alkylating agent in this reaction, it can be employed in the substantially same one as described in the C-alkylation. The reaction is usually conducted in a solvent such as liquid ammonia, dimethylformamide, dimethylsulfoxide, methanol, ethanol or any other inert solvent, though it is nonlimitative. These solvents may be employed in a mixture each other. The reaction temperature varies in accordance with the kinds of the starting compound (II), the alkaline condensing agent and a solvent to be used. The reaction is generally effected approximately at the boiling point of the solvent to be used, but when using dimethylformamide, liquid ammonia or the like, it may be effected at lower temperature.

When the compound (I) of $R_1$ or $R_2$ being haloalkyl is produced in the above-mentioned alkylations, it can be converted into the corresponding compound (I) of $R_1$ or $R_2$ being $R_3$-alkyl by treatment with an amine of the formula:
$R_2H$ wherein $R_3$ is the same meaning as defined in the formula (I).

The amine means ammonia, mono alkylamine, dialkylamine or a saturated 5 to 7 membered N-heterocyclic compound.

The reaction may be carried out in a solvent such as benzene, toluene, xylene, chloroform and any other inert solvent. When the amine used is liquid, it may act as a solvent.

RING-CLOSURE

This ring-closing reaction may be conducted by heating the compound (III) to obtain the object compound (I).

The acid residue in the definition $X_4$ of the compound (III) means an residue of an acid such as hydrohalogenic acid (e.g. hydrochloric acid, hydrobromic acid or hydroiodic acid), sulfuric acid, alkylsulfuric acid, p-toluenesulfonic acid and the like. The ring-closing reaction may advantageously be achieved in the presence of an alkaline condensing agent. As an alkaline condensing agent to be used herein, there is the same agent as employed in the N-alkylation.

The reaction is ordinally carried out in a solvent such as pyridine, picoline, dimethylaniline, trimethylamine, triethylamine, dimethylformamide and the like. When the starting compound (III) possesses halogen as an acid residue, the reaction may be accelerated by the addition of a dehydrohalogenation catalyst such as copper powder or the like. It is generally effected at a neighborhood of boiling point of a solvent to be used. If it is desired to carry out the reaction at higher temperature, a solvent having high-boiling point is to be applied for.

Though the object compound (I) may be prepared by any reaction as mentioned above, it is preferred, for the purpose of economical production of the compound (I), to select a suitable one from the above reactions or use a combination thereof, depending upon the kinds of the halogen atom on the benzene ring as well as the substituent(s) at the fifth and/or 11th position of the compound (I) to be desired. For instance, the compound (I) of $R_1$ being $R_3$-alkyl can advantageously be obtained by the C-alkylation of the starting compound (II) wherein $R_4$ is hydrogen, with an alkyl halide having a substituent of $R_3$ or the C-alkylation of said compound (I) with haloalkyl halide and then the amination of the resultant product. And also, when the compound (II) of $X_1$ and/or $X_2$ being bromine or iodine is used in the C-alkylation, there is a possibility of said halogen being substituted with lithium during this reaction. Accordingly, it is proposed to employ the N-alkylation or ring-closing reaction as explained hereinabove as an advantageous method for preparing the object compound (I) of $X_1$ and/or $X_2$ being bromine or iodine.

Thus obtained compound (I) may be converted into the corresponding salt by treatment with an organic or inorganic acid or with alkyl or aralkyl halide.

The following specific examples illustrate the production of representative compounds of this invention.

EXAMPLE 1–(1)

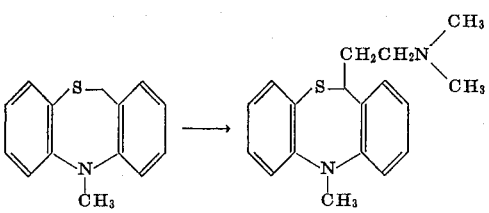

To a floating solution of lithium metal (410 mg.) in ether, was added bromobenzene (4.7 g.) and heated under reflux till the floating lithium metal disappeared. The ether solution of phenyl lithium thus prepared, was dropwise added with a solution of 5-methyl-5,11-dihydro dibenzo[b,e][1,4] thiazepine (6.1 g.) in ether (60 c.c.) and then the mixture was stirred at room temperature for 3 hours. To this mixture was added 2-dimethylaminoethyl chloride (6.0 g.) and heated under reflux for 5 hours. After cooling, the remaining lithium was filtered off. The ether layer was washed with water and further extracted with a 10 percent hydrochloric acid aqueous solution. The hydrochloric acid extract was neutralized with a 10 percent sodium hydroxide aqueous solution and the precipitating oil was extracted with chloroform. The chloroform extract was condensed and thus obtained oily substance was distilled under reduced pressure to obtain an oil (25 g.) as a distillate at 180°–182° C./0.9 mm. Hg. This oil was treated according to the conventional method for preparing an acid addition salt to obtain 5-methyl-11-(2-dimethylaminoethyl)-5,11-dihydro dibenzo[b,e][1,4]thiazepine maleate having m.p. 170°–172° C. (decomp.)

Analysis   calculated for $C_{18}H_{22}N_2S \cdot C_4H_4O_4$
   C 63.75, H 6.32, N 6.72,   S 7.72,
   Found: C 63.28, H 6.28, N 6.59,   S 7.59.

EXAMPLE 1 –(2)

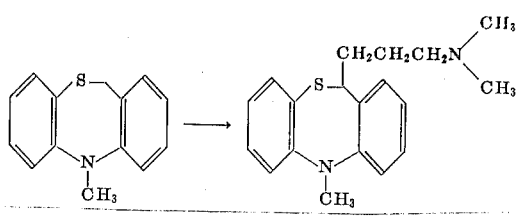

To a ether solution of phenyl lithium prepared by the reaction of lithium metal (0.41 g.) and bromobenzene (4.7 g.) according to the conventional method, was dropwise added 5-methyl-5,11-dihydro dibenzo[b,e][1,4]thiazepine (6.1 g.) in ether (60 c.c), after which the mixture was stirred at room temperature for 3 hours. To this mixture was added 3-dimethylaminopropyl chloride (6.0 g.) and the reaction mixture was heated under reflux for 5 hours.

This reaction mixture was treated in the same manner as described in example 1–(1) to obtain an oil (2.5 g.) of 5-methyl-11-(3-dimethylaminopropyl)-5,11-dihydro dibenzo[b,e][1,4]thiazepine (2.5 g.).

Analysis   calculated for $C_{19}H_{24}N_2S$
   N 8.97, S 10.24,
   Found: N 8.87, S 10.20.

According to a similar manner to examples 1–(1) and –(2) as described above, the following compounds were obtained.
5-Methyl-11-(2-diethylaminoethyl)-5,11-dihydro dibenzo[b,e][1,4]thiazepine, an oil, Analysis   calculated for $C_{20}H_{26}SN_2$
   C 73.59, H 8.03, N 8.58,
   Found:   C 73.29, H 7.95, N 8.60.

5-Methyl-11-(1-methyl-2-morpholinoethyl)-5,11-dihydro dibenzo [b,e][1,4]thiazepine, an oil as a distillate at bp. 240° C./0.5 mm. Hg Analysis   calculated for $C_{21}H_{26}ON_2S$
   C 71.14, H 7.39, N 7.90,
   S 9.05,
   Found: C 71.04, H 7.19, N 8.01,
   S 9.00.

5-Methyl-11-(3-morpholinopropyl)-5,11-dihydro dibenzo[b,e][1,4]thiazepine, an oil.

Analysis   calculated for $C_{21}H_{26}ON_2S$
   71.14, H 7.39, N 7.90,
   S 9.05,
   Found:   C 71.40, H 7.45, N 8.15,
   S 9.10.

2-Chloro-5-methyl-11-(2-dimethylaminoethyl)-5,11-dihydro dibenzo[b,e][1,4]thiazepine, a yellowish viscous oil, Analysis   calculated for $C_{18}H_{21}N_2SCl$
   C 64.94, H 6.51, N 8.39,
   S 9.63,
   Cl 10.65,
   Found:   C 65.04, H 6.54, N 8.38,
   S 9.79,
   Cl 10.80.

2-chloro-5-methyl-11-(3-dimethylaminopropyl)-5,11-dihydro dibenzo[b,e][1,4]thiazepine, a yellow oil.

Analysis   calculated for $C_{19}H_{23}N_2SCl$
   C 65.78, H 6.68, N 8.07,
   S 9.29,
   Cl 10.22,
   Found:   C 65.80, H 6.59, N 8.20,
   S 9.41,
   Cl 9.98.

5-Methyl-11[3-(1-pyrrolidinyl)propyl]-5,11-dihydro dibenzo[[b,3[1,4]thiazepine, a reddish yellow oil.

Analysis   calculated for $C_{21}H_{25}N_2S$
   C 74.52, H 7.74, N 8.28,
   S 9.46,
   Found:   C 74.34, H 7.88, N 8.14,
   S 8.89.

EXAMPLE 2 –(1)

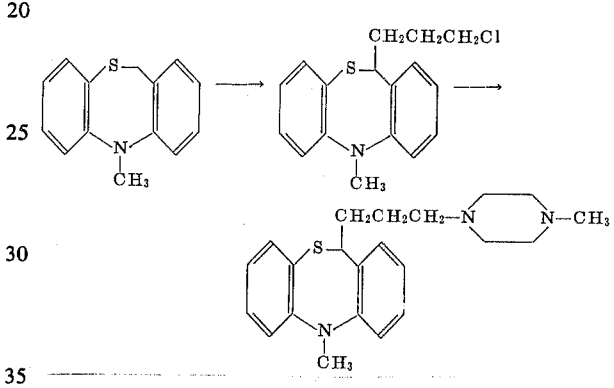

To an ether solution of phenyl lithium prepared from phenyl bromide (2.5 g.), lithium (220 mg.) and absolute ether (22 c.c.), was added dropwise 5-methyl-5,11-dihydro dibenzo[b,e][1,4]thiazepine (2.0 g.) in benzene (22 c.c). The mixture was stirred at room temperature for 3 hours and then added with 1-bromo-3-chloropropane (7.5 g.). The reaction mixture was stirred at 50° C. for 3.5 hours and cooled, after which the remaining lithium was filtered off.

The reaction mixture was washed with water and then a 10 percent hydrochloric acid aqueous solution, and dried over anhydrous mangenous sulfate. The solvent was distilled off to obtain an oil, which was subjected to chromatograph using a column packed with almina, where petroleum ether and then n-hexane were used as developing solvents and chloroform was applied as an eluting solvent. The eluting chloroform was condensed to obtain a yellow oil (2.0 g.).

Thus obtained oil (2.0 g.) was allowed to react with methylpiperazine (20 c.c.) at 120° C. for 17 hours. The reaction mixture was added with water and extracted with a mixture of benzene and ether. The extract was washed with water several times and further a 10 percent hydrochloric acid aqueous solution, and neutralized with a conc. sodium hydroxide solution and then extracted with chloroform. The chloroform layer was subjected to chromatograph using a column packed with almina in the same manner as above to obtain an oil. This oil was distilled in an oil bath under reduced pressure to obtain 5-methyl-11-[3-(4-methylpiperazinyl) propyl]-5, 11-dihydro dibenzo[b,e [1,4]thiazepine as a distillate under 0.1–0.2 mm. Hg at 240°–260° C.

Analysis calculated for $C_{22}H_{29}N_3S$
   C 71.90, H 7.95,   N 11.44, S 8.71,
   Found:   C 72.13, H 8.06,   N 11.41, S 8.76.

Its maleate was recrystallized from 99 percent ethanol to obtain pale yellow powders having mp. 185°–186° C. (decomp.).

Analysis calculated for $C_{22}H_{20}N_3 \cdot S^2 \cdot C_4H_4O_4$
   C 60.09, H 6.21, N 7.01, Found: C 60.50, H 6.23, N 7.05.

According to a similar manner to example 2–(1) described above, the following compound was obtained.

5-Methyl-11-[2-[4-(2-hydroxyethyl)piperazinyl]ethyl]-5,11-dihydro dibenzo[b,e][1,4]thiazepine, a reddish yellow viscous oil.

Analysis caLculated for $C_{22}H_{29}N_3SO$
C 68.90, H 7.62, N 10.96,
S 8.35.
Found: C 68.56, H 7.51, N 10.59,
S 8.26.

It's hydrochloride was melted at 238°–240° C.(decomp.).

Analysis calculated for $C_{22}H_{29}N_3SO \cdot 2HCl$
C 57.89, H 6.85, N 9.21,
S 7.02,
Found: C 58.23, H 6.74, N 9.36,
S 7.07.

EXAMPLE 2–(2)

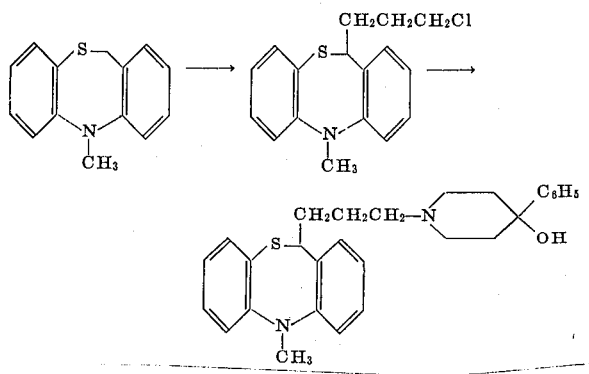

A similar manner according to example 2-(2) was occupied using xylene solution of 4-hydroxy-4-phenyl-piperidine, 5-Methyl-11-[3-(4-hydroxy-4-phenylpiperidinyl)propyl]-5,11-dihydro dibenzo [b,e][1,4]thiazepine was obtained as an oil. Infra-red Spectrum:

| 3400 cm.$^{-1}$ | (—OH) |
| 2800 cm.$^{-1}$ | (—N<) |
| 670 cm.$^{-1}$ | (mono substituted benzene) |

Nuclear Magnetic Resonance Spectrum:

| 2.5–1.5 p.p.m. | | the hydrogen atom of methylene |
| 3.20 p.p.m. | singlet | N–CH$_3$ |
| 4.95 p.p.m. | triplet | the hydrogen atom at the 11th position |
| 7.2 p.p.m. | singlet | —N⟨⟩C$_6$H$_5$ OH |
| 7.3–6.5 p.p.m. | | the hydrogen atom of benzene of dibenzothiazepine ring |

EXAMPLE 3

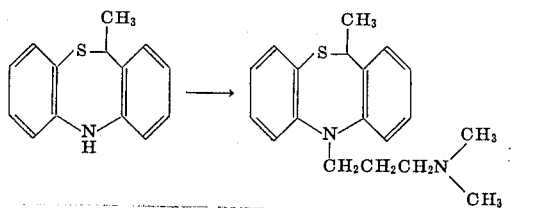

A solution of 11-methyl-5,11-dihydro dibenzo [b,e][1,4]thiazepine (2.1 g.) in absolute dimethylformamide (20 c.c.), was dropwise added, under ice-cooling, to a solution of sodium hydride (960 mg.) in absolute dimethylformamide (20 c.c.). The reaction was carried out exothermically and the color of the reaction mixture changed to reddish brown. This reaction mixture was stirred at room temperature for an hour and then at 50° C. for an hour. To this mixture was added a solution of N,N-dimethylaminopropyl chloride (1.2 g.) in dimethylformamide (10 c.c.) and the mixture was stirred at room temperature and then at 50° C. for an hour respectively. After cooling, the reaction mixture was poured into water and extracted with ether. The ether extract was washed with water and extracted with a 10 percent hydrochloric acid aqueous solution. The hydrochloric acid extract was cooled and neutralized with a 10 percent sodium hydroxide aqueous solution. The precipitating oil was extracted with ether and the ether extract was dried, after which the solvent was distilled off to obtain an oil (0.5 g.) of 5-(3-dimethylaminopropyl)-11-methyl-5,11-dihydro dibenzo[b,e][1,4]thiazepine.

This oily substance was treated according to the conventional method for preparing an acid addition salt to obtain crystals of 5-(3-dimethylaminopropyl)-11-methyl-5,11-dihydro dibenzo[b,e][1,4]thiazepine oxalate having m.p. 139°–143° C. (decomp.).

Analysis calculated for $C_{19}H_{24}N_2S \cdot C_2H_2O_4$
C 62.66, H 6.51, N 6.96, S 7.97,
Found: C 62.77, H 6.72, N 6.93, S 8.12.

EXAMPLE 4

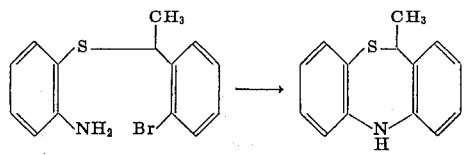

2-Amino-(α-methyl-o-bromobenzylthio)phenol (6.0 g.), potassium carbonate (6.0 g.) and cupper powders (0.6 g.) in pyridine (120 c.c.) were heated under reflux for 17–20 hours. After cooling, pyridine was distilled off under reduced pressure and the residue was subjected to a vacuum distillation to obtain an oil (2.1 g.), as a distillate at b.p. 162°–165° C./0.2 mm. Hg, of 11-methyl-5,11-dihydro dibenzo[b,e][1,4]thiazepine. Nuclear Magnetic Resonance Spectrum:

The compound of this example, having an asymmetric carbon atom on its chemical structure, shows the following absorption

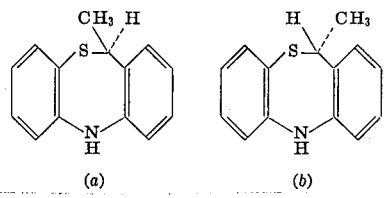

(a)  (b)

1.52 PPM (doublet, —CH$_3$ on the (a) structure)
1.57 PPM (doublet,—CH$_3$ on the (b) structure)
4.30 PPM (quartet, the hydrogen at the 11the position on the (a) structure)
4.75 PPM (quartet, the hydrogen at the 11the position on the (b) structure)

We claim:
1. A compound of the formula:

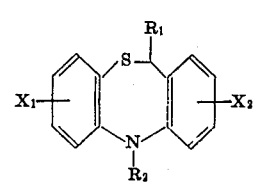

wherein each of $X_1$ and $X_2$ is hydrogen or halogen; $R_1$ is alkyl, haloalkyl or alkyl substituted with $R_3$ in which $R_3$ is amino, alkylamino or dialkylamino; and $R_2$ is hydrogen, alkyl, haloalkyl or alkyl substituted with $R_3$ in which $R_3$ is the same meaning as defined above, provided that either $R_1$ or $R_2$ should be alkyl substituted with $R_3$, wherein the alkyl group has from one to six carbon atoms.

2. The compound according to claim 1, in which $R_1$ is alkyl substituted with dialkylamino, $R_2$ is alkyl and each of $X_1$ and $X_2$ is hydrogen, i.e., 5-alkyl-11-(dialkaminoalkyl)-5,11-dihydro dibenzo[b,e][1,4]thiazepine.

3. The compound according to claim 2, in which $R_1$ is dimethylaminoethyl, $R_2$ is methyl and each of $X_1$ and $X_2$ is hydrogen, i.e., 5-methyl-11-(2-dimethylaminoethyl)-5,11-dihydro dibenzo[b,e][1,4]thiazepine.

4. The compound according to claim 2, in which $R_1$ is dimethylaminopropyl, $R_2$ is methyl and each of $X_1$ and $X_2$ is hydrogen, i.e., 5-methyl-11-(3-dimethylaminopropyl)-5,11-dihydro dibenzo[b,e][1,4]thiazepine.

5. The compound according to claim 1, in which $R_1$ is alkyl substituted with dialkylamino, $R_2$ is alkyl, $X_1$ is hydrogen and $X_2$ is 2-halo, i.e., 2-halo-5-alkyl-11,(dialkylaminoalkyl)-5,11-dihydro dibenzo[b,e][1,4]thiazepine.

6. The compound according to claim 5 in which $R_1$ is dimethylaminoethyl, $R_2$ is methyl, $X_1$ is hydrogen and $X_2$ is 2-chloro i.e., 2-chloro 5-methyl-11-(2dimethylaminoethyl)-5,11-dihydro dibenzo[b,e][1,4]thiazepine.

7. The compound according to claim 5, in which $R_1$ is dimethylaminopropyl, $R_2$ is methyl, $X_1$ is hydrogen and $X_2$ is 2-chloro, i.e., 2-chloro-5-methyl-11-(-dimethylaminopropyl)-5,11-dihydro dibenzo[b,e][1,4]thiazepine.

8. The compound according to claim 1, in which $R_1$ is alkyl, $R_2$ is alkyl substituted with dialkylamino and each $X_1$ and $X_2$ is hydrogen, i.e., 5-(dialkylaminoalkyl)-11-alkyl-5,11-dihydro dibenzo[b,e][1,4]thiazepine.

9. The compound according to claim 8, in which $R_1$ is methyl, $R_2$ is dimethylaminopropyl and each of $X_1$ and $X_2$ is hydrogen, i.e., 5-(3-dimethylaminopropyl 11-methyl-5,11-dihydro dibenzo[[b,3][1,4]thiazepine.

* * * * *

UNITED STATES PATENT OFFICE
CERTIFICATE OF CORRECTION

Patent No. 3,625,974          Dated  December 7, 1971

Inventor(s) Suminori Umio and Ikuo Ueda

It is certified that error appears in the above-identified patent and that said Letters Patent are hereby corrected as shown below:

In the Abstract, the structural formula

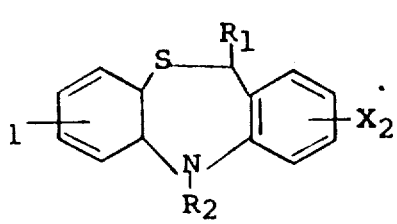   should read   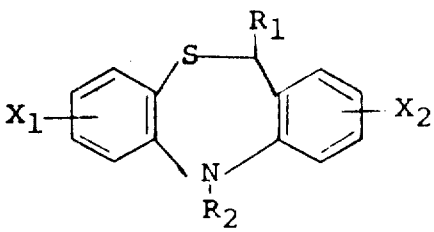

Column 1, line 36, "α-menthylbenzyl" should read --α-methylbenzyl--; line 45, "alkylmino" should read --alkylimino--; line 53, delete "a" before "nontoxic". Column 2, line 6, "lublicant" should read --lubricant--; line 19, "5the" should read --5th--; line 55, "compound" should read --compounds--; line 64, after "each" insert --be--. Column 3, line 19, "of" should read --a--; line 57, after "mixture" insert --with--. Column 5, lines 53, 61 and 69, the spaces in the formulas should be closed, making the formulas read respectively: $C_{21}H_{26}ON_2S$; $C_{21}H_{26}ON_2S$; $C_{18}H_{21}N_2SCl$. Column 6, line 4, the formula "$C_{19}H\ \ b,e]23N_2SCl$" should read --$C_{19}H_{23}N_2SCl$--; line 10, "Cl 9.98" should follow "S 9.41" in line 9; line 49, "almina" should read --alumina--; line 61, "almina" should read --alumina--; line 75, space in the formula should be closed, making it read --$C_{22}H_{29}N_3S \cdot C_4H_4O_4$--. Column 7, line 16, space in formula should be closed, making it read --$C_{22}H_{29}N_3SO \cdot 2HCl$--; line 42, after "-piperidine", the comma should be replaced by --.--. Column 8, lines 25 and 26, the formula should be on one line and read --$C_{19}H_{24}N_3S \cdot C_2H_2O_4$--. Column 10, line 6, insert a dash between "chloro" and "5".

Signed and sealed this 28th day of November 1972.

(SEAL)
Attest:

EDWARD M. FLETCHER, JR.                    ROBERT GOTTSCHALK
                                           Commissioner of Patents